Patented Aug. 18, 1953

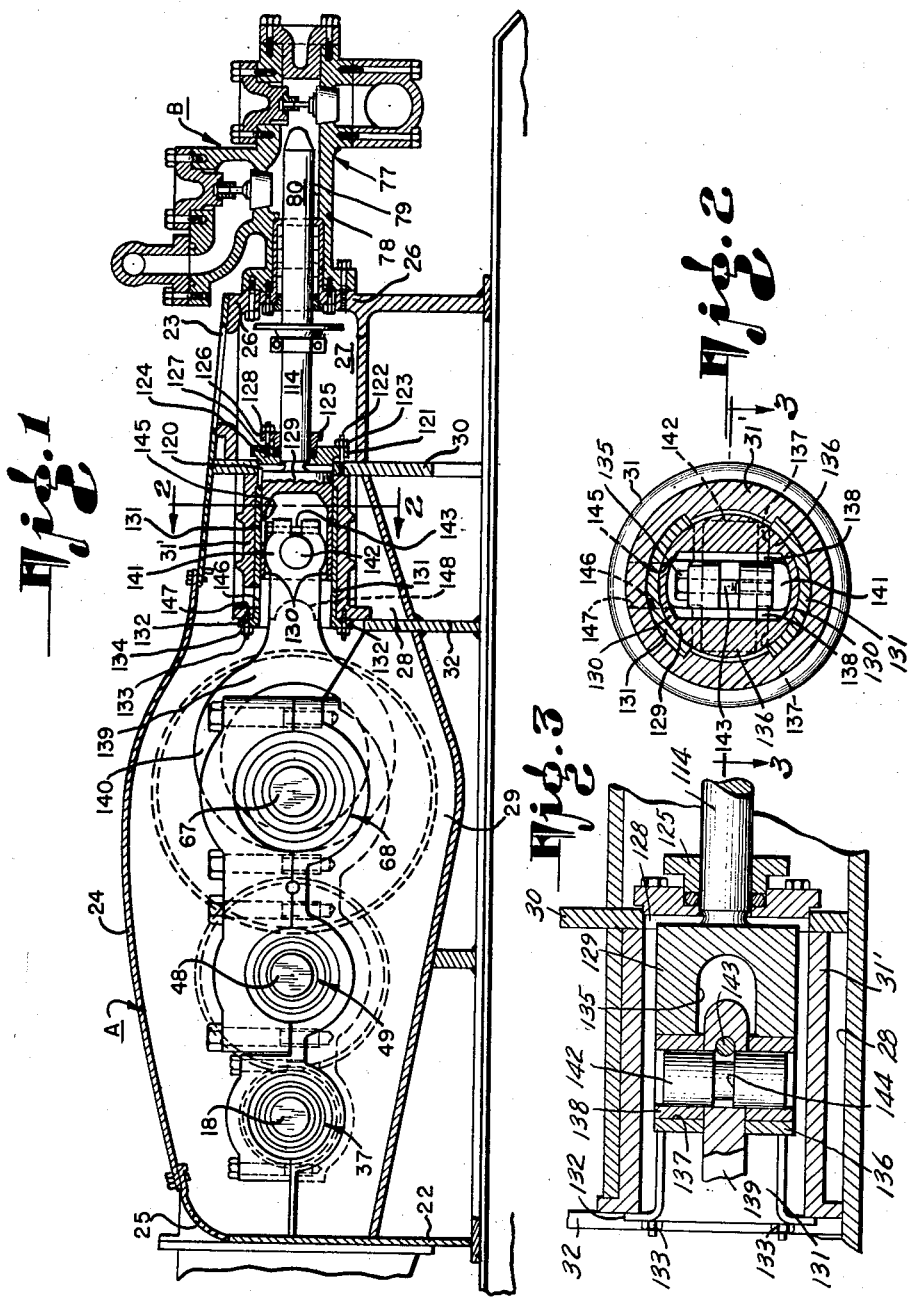

2,649,342

UNITED STATES PATENT OFFICE 2,649,342

CROSS-HEAD CONNECTION

Albert A. Ashton, Houston, Tex., assignor to Emsco Manufacturing Company, Los Angeles, Calif., a corporation of California Original application March 6, 1948, Serial No. 13,459. Divided and this application October 29, 1949, Serial No. 124,454

5 Claims. (Cl. 308—3)

The present application constitutes a division of my co-pending application, Serial No. 13,459, filed March 6, 1948, now abandoned, and the invention disclosed herein relates to a simple, heavy duty cross-head connection.

It is one object of the herein described invention to provide an improved cross-head connection of novel design, wherein bearing forces in the connection will be distributed over a greater area, and the connection parts cooperate in such manner as to stabilize the associated driving eccentric strap mounting.

A further object is to provide novel means for retaining the cross-head pin in operative position, and which facilitates disconnection of the eccentric driving strap, when necessary.

Still another object is to provide an improved cross-head connection, having novel means for releasably retaining the cross-head pin in circumferentially adjusted position, so as to enable presentation of new wearing surfaces on the pin, without the necessity of having to remove the pin.

Further objects of the invention will be brought out in the following part of the specification, wherein detailed description is for the purpose of fully disclosing preferred embodiments of the invention without placing limitations on the scope of the invention defined in the appended claims.

Referring to the drawings which are for illustrative purposes only:

Fig. 1 is a fragmentary side view, portions of the casing being removed and certain parts being in section to show the cross-head connection and the parts which it connects;

Fig. 2 is an enlarged transverse section, taken substantially on line 2—2 of Fig. 1; and Fig. 3 is a cross-section taken on the line 3—3 of Fig. 2.

In Fig. 1, the cross-head connection is shown as part of a heavy duty pump having power and fluid sections A and B. The power section A includes a housing 29 including parts 22, 23, 24, 25, 30 and 32, which contains power transmission shafts 18 and 48 supported by bearing means 37 and 49, and a crank shaft 67 supported by bearing means 68. The fluid end B includes a pump casting 77 supported by a housing wall 26 and having a generally tubular horizontally disposed body portion 78 defining a cylinder bore 79 which is operatively associated with a plunger 80 to form a positive displacement pumping mechanism. The innermost end of the plunger 80 is connected to a cross-head extension member 114.

The cross-head extension 114 passes through a chamber 27 and an opening 120 in a housing wall member 30. A ring 121 is secured thereover, as by suitable studs 122 with associated nuts 123. The ring 121 is recessed to receive a packing 124 therein and surrounding the cross-head extension 114. This packing is retained by a packing gland 125 provided with projecting lugs 126 associated with guide studs 127 supported in the stuffing box ring and having nuts 128, by means of which the packing gland may be moved into the ring recess to compress the packing therein.

The opposite end of the cross-head extension 114 from the one which is connected to the plunger 80 has associated therewith a cross-head 129 which is supported for reciprocable movement in the cross-head barrel 31', the bore of the cross-head barrel being axially aligned with the opening 120 in the wall member 30. The cross-head has upper and lower wall portions 130, as shown in Fig. 1, which provide bearing surfaces for engagement with associated cross-head guide walls disclosed as shoes 131—131. These shoes are fitted into recessed portions in the interior of the barrel 31' and are provided with beveled edges for engagement with beveled edges of the recess. The shoes are retained against removal from the barrel by means of retaining lugs 132 secured at the inner end of the barrel by means of associated studs 133 and retaining nuts 134.

As shown in Fig. 2, the cross-head 129 is internally recessed as generally indicated by the numeral 135 to define spaced apart side walls 136—136 having axially aligned apertures or openings 137 therein for receiving in each case a bushing 138.

The shaft 67 has a connection with the cross-head of a pumping mechanism, this connection being accomplished by means of a connecting rod or link 139 formed at its crank engaging end into a continuous ring portion 140 within which there is supported an anti-friction bearing connection with the eccentric.

The link 139 has its opposite end formed to provide a split ring 141 which is connected with the cross-head by inserting this end of the strap between the side walls 136—136 into the recess 135, and pivotally retaining this end of the strap from removal from the cross-head by means of a pin 142 which is inserted within the split ring 141 and has its end portions trunnioned in the bushings 137 respectively. The split ring is clamped on the pin 142 by a clamping bolt 143 arranged to draw the two sections of the split ring together. This clamping bolt also is arranged so as to position the pin 142 in an axial direction and retain the pin against axial movement within the split ring 141. As shown in Fig. 3, the pin 142 is provided with a circumferentially extending groove 144 which is positioned intermediate the ends of the pin. It will also be noted that the bolt 143 in operative position has its periphery extending into the groove 144, whereby the bolt acts as a detent for locking the pin against axial movement.

With this arrangement, it will be apparent that by loosening the bolt 143, the pin 142 may be circumferentially shifted without removing it from its bearing supports so as to subject new areas to wear. Moreover, the provision of spaced bearings 137 respectively positioned at the ends of the pin 142 results in application of the thrust of the link 139 to the center of the cross-head 129.

In order to permit disconnection of the strap and cross-head, the uppermost portion 130 of the cross-head is provided with an opening 145 which is positioned directly above the head of the bolt 143. The upper cross-head guide shoe 131 is also provided with an opening 146 which is in registration with a passage 147 in the associated wall portion of the cross-head barrel 31'. These openings are so arranged that during the operation of the crank, the opening 145 will at one position of the crank be brought into registration with the opening 146 and passage 147 so that access to the bolt 143 through these openings will be possible to enable removal of the bolt 143. Having removed the bolt 143, it will no longer lock the pin 142 against axial movement, and the pin 142 may be withdrawn through a segmental notch 148 provided at the adjacent end of the cross-head barrel 31'.

I claim:

1. In a cross-head connection for transmitting thrust between a driving member and a driven member, a cross-head for connection to one of said members, said cross-head having spaced bearing walls, a pin positioned between said bearing walls for securing an end of the other of said members to the cross-head, a locking member retaining said pin against axial removal, cross-head guides respectively engaged by the bearing walls, one of said guides and its associated bearing wall having openings brought into registration at a predetermined position of the cross-head for access to and removal of the locking member to release said pin.

2. In a cross-head connection for a link member and a reciprocable member, a cross-head connected with the reciprocable member, spaced bearings carried by said cross-head, said link member having a split clamping end positioned between said bearings, a pin extending through said split end having its ends trunnioned in said bearings, a circumferentially extending groove intermediate the ends of said pin, a member for actuating said split end into clamped engagement with said pin, said latter member extending into said groove to restrain the pin against axial movements, but enable rotational adjustment of the pin, when the split end is unclamped relative to the pin and guide means for said piston provided with a lateral opening through which said pin may be removed and said cross-head disconnected from said link member.

3. In a cross-head connection for transmitting thrust between a driving member and a driven member, a cross-head for connection to one of said members, said cross-head having spaced bearing walls, a pin positioned between said bearing walls for securing an end of the other of said members to the cross-head, a screw member retaining said pin against axial removal, cross-head guides respectively engaged by the bearing walls, one of said guides and its associated bearing wall having openings brought into registration at a predetermined position of the cross-head for access to and rotation of the screw member to release said pin.

4. In a cross-head connection for a link member and a reciprocable member, a cross-head connected with the reciprocable member, spaced bearings and spaced bearing walls carried by said cross-head, said link member having a split clamping end positioned between said bearings, a pin extending through said split end having its ends trunnioned in said bearings, a circumferentially extending groove intermediate the ends of said pin, and a screw for actuating said split end into clamped engagement with said pin, said screw extending into said groove to restrain the pin against axial movements, but enable rotational adjustment of the pin, when the split end is unclamped relative to the pin, cross-head guides respectively engaged by the bearing walls, one of said guides and its associated bearing wall having openings brought into registration at a predetermined position of the cross-head for access to and rotation of the screw member to release said pin.

5. In a cross-head connection for transmitting thrust between a driving member and a driven member, a cross-head for connection to one of said members, said cross-head having spaced bearing walls, a pin positioned between said bearing walls for securing an end of the other of said members to the cross-head, a screw member retaining said pin against axial removal, a supporting structure, cross-head guides supported by said supporting structure so as to be respectively engaged by the bearing walls, one of said guides and its associated bearing wall having openings brought into registration at a predetermined position of the cross-head for access to and rotation of the screw member to release said pin, and said structure being formed so as to provide a space through which said pin may be withdrawn from said cross-head.

ALBERT A. ASHTON.

References Cited in the file of this patent

UNITED STATES PATENTS

| Number | Name | Date |
|---|---|---|
| 487,895 | Stanwood | Dec. 13, 1892 |
| 1,147,915 | Ayers | July 27, 1915 |
| 1,524,554 | Keen | Jan. 27, 1925 |
| 1,590,253 | Parsons | June 29, 1926 |
| 1,604,793 | Stratton | Oct. 26, 1926 |
| 2,430,176 | Husted | Nov. 4, 1947 |
| 2,461,056 | Hess | Feb. 8, 1949 |